US010579797B2

(12) United States Patent  
Lin et al.

(10) Patent No.: US 10,579,797 B2  
(45) Date of Patent: Mar. 3, 2020

(54) PROGRAM INTEGRITY MONITORING AND CONTINGENCY MANAGEMENT SYSTEM AND METHOD

(71) Applicant: TRADE-VAN INFORMATION SERVICES CO., Taipei (TW)

(72) Inventors: Heng-Sheng Lin, Taipei (TW); Shih-Kang Yen, Taipei (TW)

(73) Assignee: TRADE-VAN INFORMATION SERVICES CO., Taipei (TW)

( * ) Notice: Subject to any disclaimer, the term of this patent is extended or adjusted under 35 U.S.C. 154(b) by 238 days.

(21) Appl. No.: 15/869,327

(22) Filed: Jan. 12, 2018

(65) Prior Publication Data

US 2018/0336350 A1    Nov. 22, 2018

(30) Foreign Application Priority Data

May 19, 2017    (TW) .............................. 106116665 A (51) Int. Cl.
*G06F 21/56*        (2013.01)
*G06F 21/51*        (2013.01)

(52) U.S. Cl.
CPC .............. *G06F 21/56* (2013.01); *G06F 21/51* (2013.01); *G06F 21/566* (2013.01); *G06F 2221/033* (2013.01)

(58) Field of Classification Search
CPC ....... G06F 21/56; G06F 21/561; G06F 21/564
See application file for complete search history.

(56) References Cited

U.S. PATENT DOCUMENTS

| 9,009,820 | B1* | 4/2015 | McDougal | G06F 21/56 |
| | | | | 726/22 |
| 9,251,343 | B1* | 2/2016 | Vincent | G06F 21/575 |
| 9,569,617 | B1* | 2/2017 | Chen | G06F 21/56 |
| 10,204,224 | B2* | 2/2019 | Lu | G06F 21/563 |
| 2012/0011200 | A1* | 1/2012 | Zhang | H04L 67/1097 |
| | | | | 709/204 |
| 2012/0079596 | A1* | 3/2012 | Thomas | G06F 21/55 |
| | | | | 726/24 |

(Continued)

*Primary Examiner* — Lynn D Feild
*Assistant Examiner* — Viral S Lakhia
(74) *Attorney, Agent, or Firm* — Amin, Turocy & Watson, LLP (57) ABSTRACT

The present disclosure provides a program integrity monitoring and contingency management system and method. The system includes a monitoring-notifying module and a contingency management module. The monitoring-notifying module includes a management unit configuring an exclusion profile and a program integrity monitoring profile, a setup unit establishing a file integrity baseline list according to the program integrity monitoring profile, a notifying unit, and an integrity comparison unit comparing the exclusion profile and the file integrity baseline list with the program integrity file, and generating an abnormality warning when the comparison result is abnormal and instructing the notifying unit to report the same. The contingency management module includes an evidence-collecting unit collecting and storing the program integrity file upon generation of an abnormality warning, and a software malicious program detection unit comparing the program integrity file with virus signatures in a database to determine whether the program integrity file is a software malicious program.

14 Claims, 4 Drawing Sheets

(56) References Cited

U.S. PATENT DOCUMENTS

| | | | |
|---|---|---|---|
| 2012/0159628 A1* | 6/2012 | Dai | G06F 21/552 |
| | | | 726/24 |
| 2015/0121522 A1* | 4/2015 | Guido | H04L 63/145 |
| | | | 726/23 |
| 2016/0217282 A1* | 7/2016 | Vecera | G06F 21/565 |
| 2017/0185771 A1* | 6/2017 | Sun | G06F 21/57 |
| 2017/0214716 A1* | 7/2017 | Lee | H04L 63/1416 |
| 2017/0316206 A1* | 11/2017 | Zou | G06F 11/34 |
| 2018/0025157 A1* | 1/2018 | Titonis | G06F 21/56 |
| | | | 726/24 |

* cited by examiner

| file scheduling list | |
|---|---|
| hash values (2121a) | file paths (2121b) |
| 454f18e41a013613e0976d421803c4ced | /root/TVFIV/test_web/test_web/alerts.php |
| 454f18e41a013613e0976d421803c4ced | /root/TVFIV/test_web/bbb/alerts.php |
| f3632ad3772r78d99e5b01808aa3br19 | /root/TVFIV/test_web/bbb/ccc/123.txt |
| a08fb3af9246dac1bf0759937ce15cae | /root/TVFIV/test_web/alertexcel.php |
| a678r26866c1ff2b2c66cf211a4f2314 | /root/TVFIV/test_web/FIv_solaris.pl |
| a09ec4c22dcee3e29d6284c80f8f0a5a | /root/TVFIV/test_web/w1s_conf.php |
| 2fd51erefrf670f7abfdad731e06d4d4b | /root/TVFIV/test_web/1.txt |
| c1947d8c314663dernnbac3934bbe6d1 | /root/TVFIV/test_web/aaa/123.log |
| d41d8cd98erbebre0b28099998ecf8427e | /root/TVFIV/test_web/tes.te |
| 03282fe3a836f8f54561,ee054ca64f1 | /root/TVFIV/test_web/index.php |
| d08fadae1710f0486039ed453r3f77274 | /root/TVFIV/test_web/alertform_submit.php |
| ea46643ebe878fcf03386314668a0f32 | /root/TVFIV/test_web/alertform.php |
| 7e486ac8d0004104cf3e0d8330844f1a5c | /root/TVFIV/test_web/alerts_search.php |
| 7f23f5da720d811bb6b4af a0b09910bcc | /root/TVFIV/test_web/test.sql |
| 65255d264fed9ea3c2cc0f466a085840 | /root/TVFIV/test_web/Alert.wav |

PROGRAM INTEGRITY MONITORING AND CONTINGENCY MANAGEMENT SYSTEM AND METHOD

BACKGROUND

1. Technical Field

The present disclosure relates to techniques for program integrity monitoring and contingency management, and, more particularly, to a program integrity monitoring and contingency management system and method.

2. Description of Related Art

With advances in technology, people have become accustomed to gather information from browsing on the Web or use function specific equipment such as public information machines (or so-called kiosks) or Point of Sale Terminals (POSs) at supermarkets and banks or the like to carry out online trades. Although the progress of science and technology has given people a lot of convenience, but it is accompanied by an increase in the risk of security brought about by hackers or viruses on the Internet, therefore anti-virus and monitoring software have been created to address this.

Most of the existing anti-virus or monitoring software are capable of monitoring abnormality in site traffic or system log and detect the intrusion of viruses. However, the existing anti-virus software is poor in detecting unknown virus or script virus. Moreover, security monitoring software often retains a large amount of log information, professional analysis is often required for the investigation and evidence collection of a security breach, which makes it difficult to satisfy the need for quick investigation and evidence collection to appropriately respond to and reduce damage brought by security contingencies. In addition, websites often allow users to upload files or pictures. Traditionally, whitelist file restriction mechanism is used to prevent hackers from exploiting upload loopholes. However, as these sites require file or picture upload, the entire directory of the whitelist has to be excluded. Indiscriminating exclusion rules make it hard to enforce comprehensive and effective security protection.

Therefore, there is a need for a solution that addresses the aforementioned issues in the prior art.

SUMMARY

In view of the aforementioned shortcomings of the prior art, the present disclosure provides a program integrity monitoring and contingency management system used for monitoring program integrity on websites or in function-specific equipment such as Kiosks or POS.

The present disclosure provides a program integrity monitoring and contingency management system applicable to an electronic device including a storage and a processor. The system may include: a monitoring-notifying module and a contingency management module. The monitoring-notifying module may include a management unit, a setup unit and an integrity comparison unit. The contingency management module may include an evidence-collecting unit and a software malicious program detection unit. The management unit is used for configuring an exclusion profile and a program integrity monitoring profile. The setup unit is used for setting up a file integrity baseline list based on the program integrity monitoring profile. The integrity comparison unit is used for comparing a program integrity file with the exclusion profile and the file integrity baseline list, and generating an abnormality warning when a comparison result is abnormal. The notifying unit notifies the abnormality warning. When the abnormality warning is generated, the evidence-collecting unit collects evidence about the program integrity file and stores the program integrity file, and the software malicious program detection unit compares the program integrity file with virus signatures in a database to determine if the program integrity file is a malicious program.

The present disclosure further provides a program integrity monitoring and contingency management method applicable in an electronic device including a storage and a processor. The method may include: configuring an exclusion profile and a program integrity monitoring profile; setting up a file integrity baseline list based on the program integrity monitoring profile; comparing a program integrity file with the exclusion profile and the file integrity baseline list, and generating and reporting an abnormality warning when a comparison result is abnormal; and collecting evidence about the program integrity file and storing the program integrity file when the abnormality warning is generated, and comparing the program integrity file with virus signatures in a database to determine if the program integrity file is a malicious program.

In an embodiment, the storage is a register, a memory, a memory card or a magnetic disk; the processor is a microprocessor or a central processing unit (CPU); and the electronic device is a server.

In an embodiment, the monitoring-notifying module, the management unit, the setup unit, the integrity comparison unit, the notifying unit, the contingency management module, the evidence-collecting unit and the software malicious program detection unit are all software programs, and the software programs are all stored in the storage and processed by the processor.

In an embodiment, the monitoring-notifying module further includes an exclusion management unit for comparing the program integrity file based on the exclusion profile to prevent known normal integrity (e.g., a user uploading a picture file) from triggering the generation of the abnormality warning.

In an embodiment, the system may further include a recovery unit for performing automatic system recovery based on a backup file established by the setup unit when the software malicious program detection unit determines that the program integrity file is a malicious program. In another embodiment, the recovery unit is a software program.

In an embodiment, the file integrity baseline list may include a plurality of hash values and a plurality of corresponding file paths.

In an embodiment, the exclusion profile may or may not include exclusion rules for excluding a data file that allows user changes to avoid false warnings.

As can be seen from above, the program integrity monitoring and contingency management system according to the present disclosure can be used to monitor changes occurred in programs of general websites or function-specific equipment such as kiosks or Point of Sale Terminals (POSs), and automatically transmit messages notifying potential intrusion file programs (backdoor programs) implanted by hackers. It can be integrated into Security Information and Event Management (SIEM) platform through "send event" in system log. Establishing the program integrity monitoring profile allows for comparison with the file integrity baseline list. When a program integrity file is monitored, suspicious file program can be retained for further investigation through the evidence-collecting unit. In addition, the program integrity file is checked against all known malicious programs by the software malicious program detection unit. If the program integrity file is determined to be a malware by the software malicious program detection unit, the recovery unit then performs automatic system recovery based on the backup file established by the setup unit to achieve automatic contingency management on program integrity. In addition, the exclusion management unit excludes known normal integrity, such as normal uploading of a file onto the website, to prevent the notifying unit from issuing an abnormal warning. As such, risks of potential hacker intrusions can be quickly controlled to maintain the integrity and normal operations of the system.

In order to facilitate understanding of the aforementioned features and advantages of the present disclosure, embodiments thereof are described in conjunction with illustration of the appended drawings. In the following descriptions, additional features and advantages of the present disclosure are partially described, such features and advantages may become apparent from the descriptions or through implementations of the present disclosure. The features and advantages of the present disclosure can be appreciated and achieved with the help of the elements and various combinations thereof given by the appended claims. It should be understood that the aforementioned general descriptions and the following detailed descriptions are for illustrative and explanatory purposes only, and are by no means intended to limit the scope of the present disclosure set forth by the appended claims.

DETAILED DESCRIPTION OF THE EMBODIMENTS

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

Figure 1:
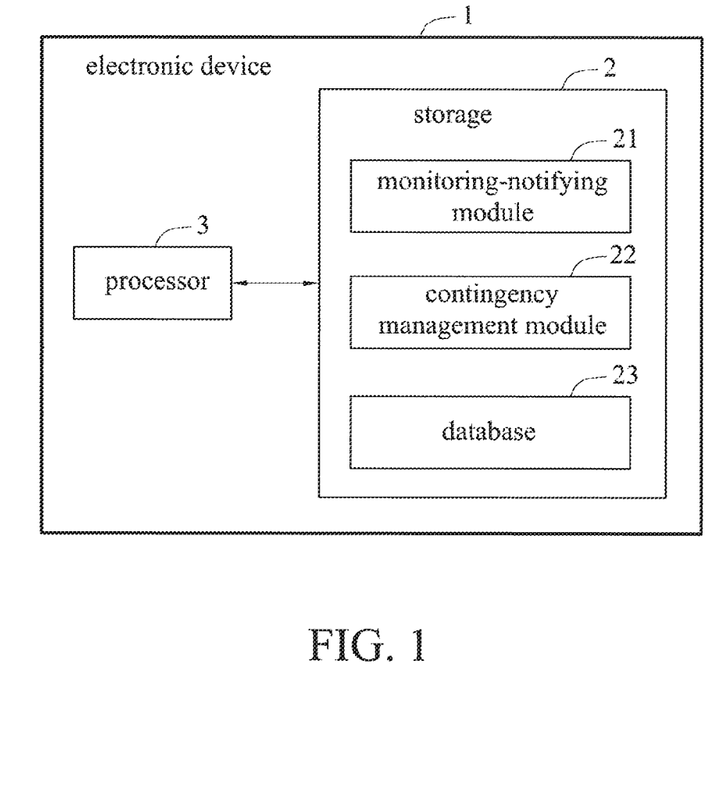
FIG. 1 is a schematic block diagram depicting an electronic device for a program integrity monitoring and contingency management system in accordance with the present disclosure.
Figure 2:
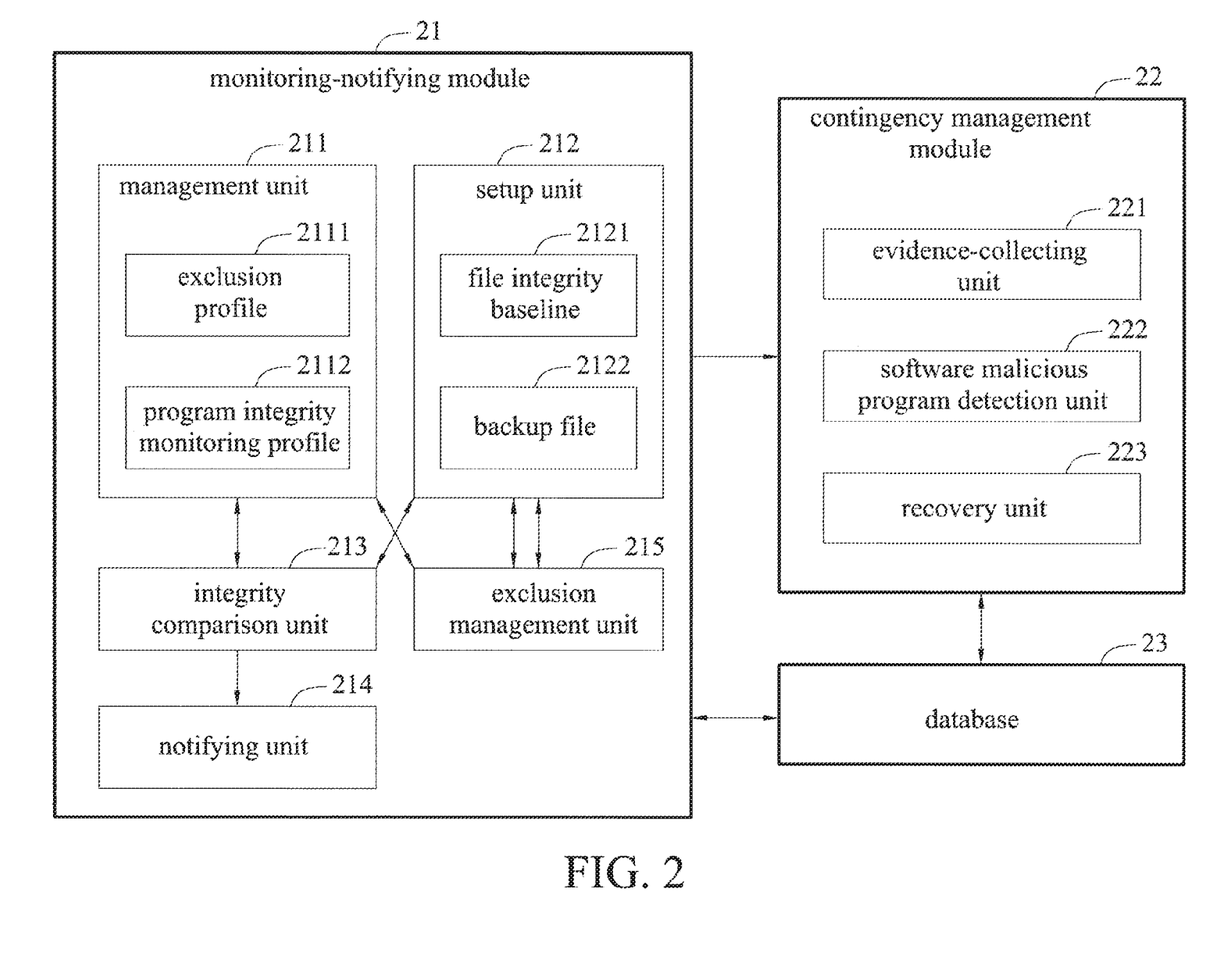
FIG. 2 is a schematic block diagram depicting the program integrity monitoring and contingency management system in accordance with the present disclosure.
Figure 3:
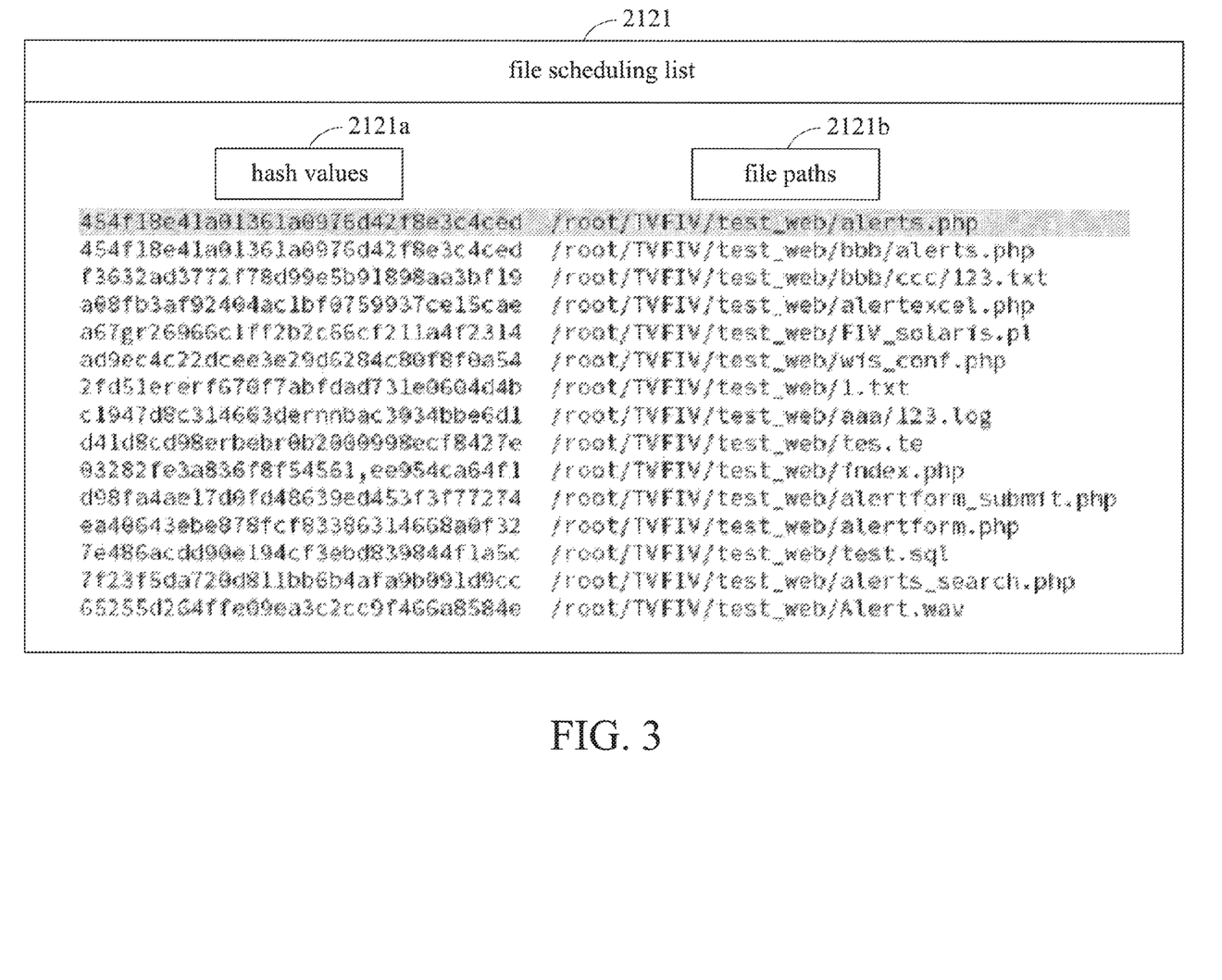
FIG. 3 is a diagram showing the composition of a file integrity baseline list for the program integrity monitoring and contingency management system in accordance with the present disclosure.

FIG. 1 is a schematic block diagram depicting an electronic device for a program integrity monitoring and contingency management system in accordance with the present disclosure. FIG. 2 is a schematic block diagram depicting the program integrity monitoring and contingency management system in accordance with the present disclosure. FIG. 3 is a diagram showing the composition of a file integrity baseline list for the program integrity monitoring and contingency management system in accordance with the present disclosure.

As shown in FIGS. 1 and 2, the program integrity monitoring and contingency management system according to the present disclosure is applicable to an electronic device 1 including a storage 2, a processor 3 and an operating system (not shown). The storage 2 can be a register, a memory (e.g., a cache memory or a random access memory), a memory card or magnetic disk (or a hard disk or optical disk), or the like. The processor 3 can be a microprocessor or a CPU. The electronic device 1 can be a server (e.g., a central server, a network server or a cloud server). The above are for exemplary purpose only, and the present disclosure is not limited as such.

The program integrity monitoring and contingency management system includes a monitoring-notifying module 21 and a contingency management module 22. As shown in FIG. 1, the monitoring-notifying module 21, the contingency management module 22 and a database 23 are stored in the storage 2. The processor 3 is electrically connected with the storage 2 for related program operation and information exchange.

As shown in FIG. 2, the monitoring-notifying module 21 includes a management unit 211, a setup unit 212, an integrity comparison unit 213 and a notifying unit 214. The management unit 211 is essentially used for carrying out setup management for configuring up information such as a monitoring range, targets to be notified, a notifying method and information, contingency handling and the like. The management unit 211 includes configuring an exclusion profile 2111 and a program integrity monitoring profile 2112. The exclusion profile 2111 includes at least one exclusion rule for excluding normal data file (e.g., a data file that allows user changes) to prevent the generation of false warning. In other words, the exclusion rule excludes normal data files, such as data files uploaded by Internet users (including picture files, text files etc.) while setting up relevant monitoring and notifying data to avoid misreporting normal application programs. In an embodiment, the exclusion profile 2111 may alternatively include no exclusion rules.

The setup unit 212 establishes a file integrity baseline list 2121 and a backup file 2122 based on the program integrity monitoring profile 2112. As shown in FIG. 3, the file integrity baseline list 2121 includes a plurality of hash values 2121a and a plurality of corresponding file paths 2121b. The hash values 2121a and the file paths 2121b have one-to-one association. In an embodiment, every time a program integrity is authorized, the program integrity monitoring and contingency management system can temporarily stop the monitoring mechanism. After the files are deployed, the setup unit 212 then re-establishes the file integrity baseline list 2121, and creates a backup file 2122 for files that are within the monitoring range for later auto-recovery.

The integrity comparison unit 213 compares a program integrity file with the exclusion profile 2111 in the management unit 211 and the file integrity baseline list 2121 in the setup unit 212. In other words, the integrity comparison unit 213 may monitor and calculate the hash values of the files within the monitoring range and data in the program integrity monitoring profile 2112 in real time or periodically. When the comparison result is abnormal, the integrity comparison unit 213 generates an abnormality warning. Then, the integrity comparison unit 213 sends the abnormality warning to the notifying unit 214. The notifying unit 214 notifies relevant personnel about this abnormality warning.

The notifying unit 214 may report any program integrity information monitored by sending an email or the "send event" function in the system log.

In some embodiments, the monitoring-notifying module 21 further includes an exclusion management unit 215. The exclusion management unit 215 compares the program integrity file based on the exclusion profile 2111. Besides, the exclusion management unit 215 analyzes the exclusion rule(s) and configures mechanisms such as exclusion paths, exclusion files, exclusion file name in the monitoring range to prevent known normal integrity, for example, a normal uploading of a file onto the website, from triggering the notifying unit 214 to report an abnormality warning. The exclusion rule can be defined using regular expression or self-defined to exclude any normal program integrity within the monitoring range.

As shown in FIG. 2, the contingency management module 22 includes an evidence-collecting unit 221 and a software malicious program detection unit 222. When an abnormality warning is generated, the evidence-collecting unit 221 immediately collects evidence about the program integrity file and stores the program file for subsequent investigation and evidence use. In other words, when the integrity comparison unit 213 finds the program integrity file and the program integrity monitoring profile 2112 are different and the integrity is abnormal, the evidence-collecting unit 221 then automatically collects evidence about the program integrity file that is not being excluded by the exclusion rule(s) and retains the calculated hash list as original data for subsequent forensics analysis and investigation, and ensures the integrity of the forensic data. In other words, suspicious file programs are retained through the evidence-collecting function for further investigation and future review in order to prevent attack from the same malicious program again.

In an embodiment, when the abnormality warning is generated, the software malicious program detection unit 222 compares the program integrity file with virus signatures in the database 23 to determine if the integrity program is a malicious program. In other words, the software malicious program detection unit 222 can perform malicious program detection based on the virus signatures or in combination with one or more external antivirus software, so that more notifying information can be provided to determine if a back door program has been implanted into the system by a malicious program, thus increasing the efficiency and accuracy of the detection for malicious programs.

In some embodiments, the contingency management module 22 further includes a recovery unit 223. When the software malicious program detection unit 222 detects that the program integrity file is a malicious program, the software malicious program detection unit 222 then reports relevant messages to the recovery unit 223. The recovery unit 223 then performs system recovery based on the backup file 2122 created by the setup unit 212. In other words, files/data illegitimately deleted by the malicious program are recovered; files/data added by the malicious program are deleted; or data modified by the malicious program are returned back to their initial states. In other words, the recovery unit 223 can return the monitoring range back to file programs and directory structures established at the beginning by the program integrity monitoring and contingency management system.

In an embodiment, the monitoring-notifying module 21, the management unit 211, the setup unit 212, the integrity comparison unit 213, the notifying unit 214, the contingency management module 22, the evidence-collecting unit 221 and the software malicious program detection unit 222 are all software programs. As shown in FIG. 1, the software programs are all stored in the storage 2, and the relevant data processing is processed by the processor 3.

As can be seen from above, the program integrity monitoring and contingency management system according to the present disclosure can be used to monitor integrity occurred in programs according to general websites or function-specific equipment such as kiosks or Point of Sale Terminals (POSs), and automatically transmit messages notifying potential intrusion file programs (backdoor programs) implanted by hackers. It can be integrated into Security Information and Event Management (SIEM) platform through "send event" in system log, thereby performing automatic contingency handling on program integrity, quickly controlling hacker intrusions, and minimizing information security risks of unknown backdoor programs that cannot be detected by antivirus software by detecting abnormal integrity to maintain the integrity and normal operations of the system.

Figure 4:
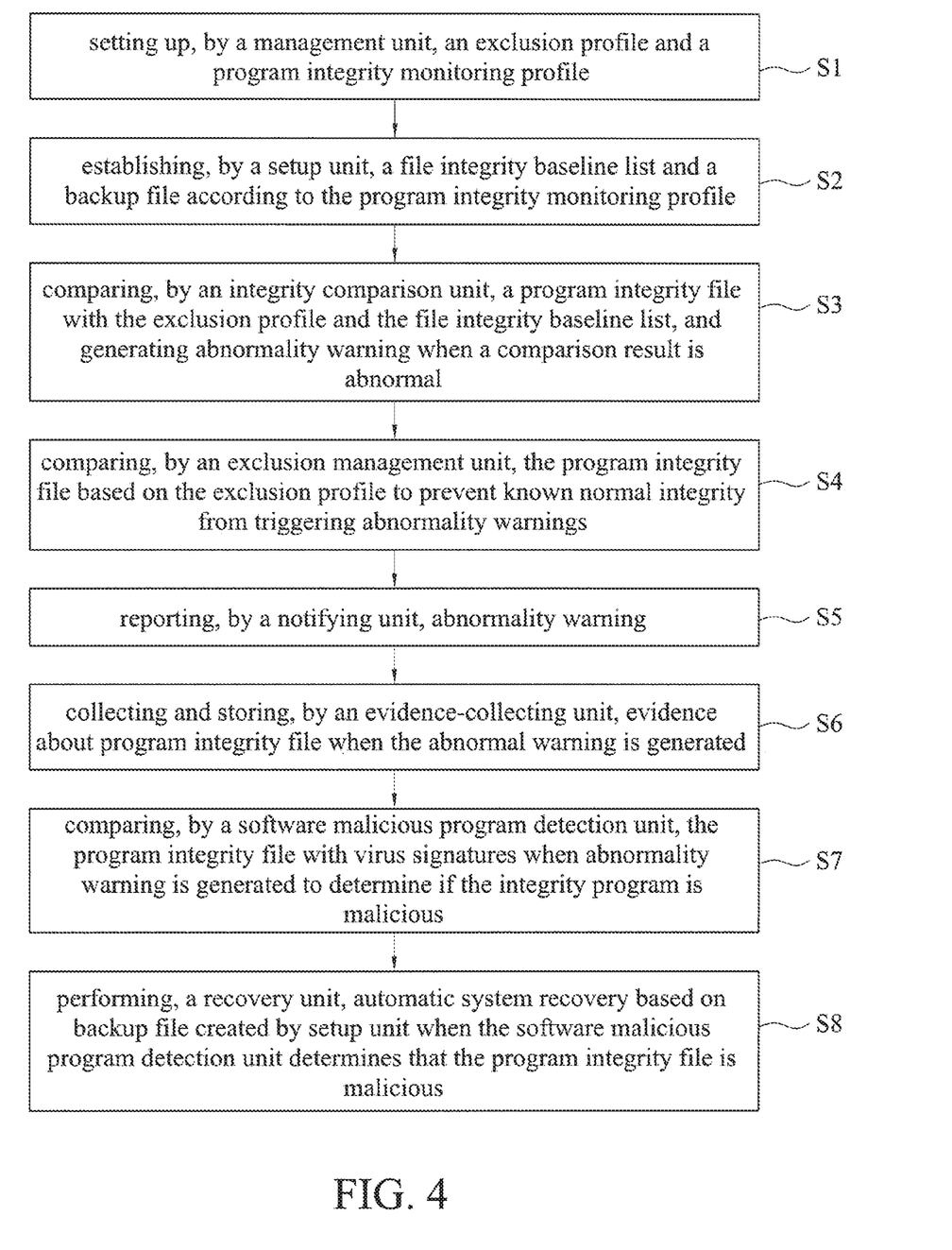
FIG. 4 is a flowchart illustrating a program integrity monitoring and contingency management method in accordance with the present disclosure.

FIG. 4 is a flowchart illustrating a program integrity monitoring and contingency management method in accordance with the present disclosure. As shown in FIG. 4, the method is applicable to an electronic device 1 including a storage 2 and a processor 3. The method includes steps S1-S8.

Step S1: A management unit 211 is used to setup an exclusion profile 2111 and a program integrity monitoring profile 2112. The management unit 211 is essentially used for carrying out setup management for setting up information such as a monitoring range, targets to be notified, a notifying method and information, contingency handling and the like. The exclusion profile 2111 includes at least one exclusion rule for excluding normal data file (e.g., a data file that allows user changes) to prevent the generation of false warnings. In other words, the exclusion rule excludes normal data files, such as data files uploaded by Internet users (including picture files, text files etc.) while setting up relevant monitoring and notifying data to avoid misreporting normal application programs. In some embodiments, the exclusion profile 2111 may alternatively include no exclusion rules.

Step S2: A setup unit 212 is used to establish a file integrity baseline list 2121 and a backup file 2122 based on the program integrity monitoring profile 2112. The file integrity baseline list 2121 includes a plurality of hash values 2121a and a plurality of corresponding file paths 2121b. The hash values 2121a and the file paths 2121b have one-to-one association. In some embodiments, every time a program integrity is authorized (e.g., normal program updates), the program integrity monitoring and contingency management system can temporarily stop the monitoring mechanism. After the files are deployed, the setup unit 212 then re-establishes the file integrity baseline list 2121, and creates the backup file 2122 for files that are within the monitoring range for later auto-recovery.

Step S3: An integrity comparison unit 213 is used to compare a program integrity file with the exclusion profile 2111 and the file integrity baseline list 2121. When the comparison result is abnormal, the integrity comparison unit 213 generates an abnormality warning.

Step S4: An exclusion management unit 215 is used to compare the program integrity file based on the exclusion profile 2111 to prevent known normal integrity from triggering abnormality warnings. The exclusion management unit 215 analyzes the exclusion rule(s) and configures mechanisms such as exclusion paths, exclusion files, exclusion file name in the monitoring range to prevent known normal integrity, for example, a normal uploading of a file onto the website, from triggering the notifying unit 214 to report an abnormality warning. The exclusion rule can be defined using regular expression or self-defined to exclude any normal program integrity within the monitoring range.

Step S5: A notifying unit 214 is used to notify relevant personnel about the abnormality warning. The integrity comparison unit 213 monitors and calculates the hash values of the files within the monitoring range and data in the program integrity monitoring profile 2112 in real time or periodically. When the comparison result is abnormal, the integrity comparison unit 213 generates an abnormality warning. Then, the integrity comparison unit 213 sends the abnormality warning to the notifying unit 214, which then notifies the relevant personnel about the abnormality warning. The notifying unit 214 may report program integrity information monitored by sending an email or the "send event" function in the system log.

Step S6: When an abnormal warning is generated, an evidence-collecting unit 221 is used to collect and store evidence about the program integrity file. When the integrity comparison unit 213 finds the program integrity file and the program integrity monitoring profile 2112 are different and the integrity is abnormal, the evidence-collecting unit 221 then automatically collects evidence about the program integrity file that is not being excluded by the exclusion rule(s) and retains the calculated hash list as original data for subsequent forensics analysis and investigation, and ensures the integrity of the forensic data. In other words, suspicious file programs are retained through the evidence-collecting function for further investigation and also future review in order to prevent attack from the same malicious program again.

Step S7: When the abnormality warning is generated, a software malicious program detection unit 222 compares the program integrity file with virus signatures in a database to determine if the integrity program is a malicious program. The software malicious program detection unit 222 performs malicious program detection based on the virus signatures or in combination with one or more external antivirus software, so that more notifying information can be provided to determine if a back door program has been implanted into the system by a malicious program, thus increasing the efficiency and accuracy of the detection for malicious programs.

Step S8: When the software malicious program detection unit 222 detects the program integrity file is a malicious program, a recovery unit 223 performs automatic system recovery based on the backup file 2122 created by the setup unit 212. The recovery unit 223 recovers files/data illegitimately deleted by the malicious program; deletes files/data added by the malicious program; or returns data modified by the malicious program back to their initial states. In other words, the recovery unit 223 can return the monitoring range back to file programs and directory structures established at the beginning by the program integrity monitoring and contingency management system.

As can be seen from above, the program integrity monitoring and contingency management system according to the present disclosure can be used to monitor integrity occurred in programs of general websites or function-specific equipment such as kiosks or Point of Sale Terminals (POSs), and automatically transmit messages notifying potential intrusion file programs (backdoor programs) implanted by hackers. It can be integrated into Security Information and Event Management (SIEM) platform through "send event" in system log. Establishing the program integrity monitoring profile and the file integrity baseline list allows for comparison before and after. When a program integrity file is monitored, suspicious file program can be retained for further investigation through the evidence-collecting unit. In addition, the program integrity file is checked against all known malicious programs by the software malicious program detection unit. If the program integrity file is determined to be a malware by the software malicious program detection unit, then the recovery unit performs automatic system recovery based on the backup file established by the setup unit to achieve automatic contingency management on program integrity. Besides, the exclusion management unit excludes known normal integrity, such as normal uploading of a file onto the website, to prevent the notifying unit from issuing an abnormal warning. As such, risks of potential hacker intrusions can be quickly controlled to maintain the integrity and normal operations of the system.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A program integrity monitoring and contingency management system for an electronic device including a storage and a hardware processor, the system comprising:
   a monitoring-notifying module, including:
   a management unit configured for configuring an exclusion profile and a program integrity monitoring profile;
   a setup unit configured for setting up a file integrity baseline list based on the program integrity monitoring profile;
   an integrity comparison unit configured for comparing a program integrity file with the exclusion profile and the file integrity baseline list, and when a comparison result is abnormal, generating an abnormality warning; and
   a notifying unit configured for notifying the abnormality warning; and a contingency management module, including:
   an evidence-collecting unit configured for collecting evidence about the program integrity file and storing the program integrity file when the abnormality warning is generated;
   a software malicious program detection unit configured for comparing the program integrity file with virus signatures in a database when the abnormality warning is generated to determine if the program integrity file is a malicious program; and
   a recovery unit configured for performing automatic system recovery based on a backup file established by the setup unit when the software malicious program detection unit determines that the program integrity file is the malicious program.

2. The program integrity monitoring and contingency management system of claim 1, wherein the storage is a register, a memory, a memory card or a magnetic disk.

3. The program integrity monitoring and contingency management system of claim 1, wherein the processor is a microprocessor or a central processing unit (CPU).

4. The program integrity monitoring and contingency management system of claim 1, wherein the electronic device is a server.

5. The program integrity monitoring and contingency management system of claim 1, wherein the monitoring-notifying module, the management unit, the setup unit, the integrity comparison unit, the notifying unit, the contingency management module, the evidence-collecting unit and the software malicious program detection unit are software programs stored in the storage and processed by the processor.

6. The program integrity monitoring and contingency management system of claim 1, wherein the monitoring-notifying module further includes an exclusion management unit configured for comparing the program integrity file based on the exclusion profile to prevent known normal integrity from triggering the generation of the abnormality warning.

7. The program integrity monitoring and contingency management system of claim 6, wherein the exclusion management unit is a software program.

8. The program integrity monitoring and contingency management system of claim 1, wherein the recovery unit is a software program.

9. The program integrity monitoring and contingency management system of claim 1, wherein the file integrity baseline list includes a plurality of hash values and a plurality of corresponding file paths.

10. The program integrity monitoring and contingency management system of claim 1, wherein the exclusion profile includes at least one exclusion rule for excluding a data file.

11. A program integrity monitoring and contingency management method for an electronic device including a storage and a processor, the method comprising:
configuring an exclusion profile and a program integrity monitoring profile;
setting up a file integrity baseline list based on the program integrity monitoring profile; comparing a program integrity file with the exclusion profile and the file integrity baseline list, and when a comparison result is abnormal, generating and reporting an abnormality warning;
when the abnormality warning is generated, collecting evidence about the program integrity file, and storing the program integrity file; and comparing the program integrity file with virus signatures in a database to determine if the program integrity file is a malicious program; and
a recovery unit configured for performing automatic system recovery based on a backup file established by the setup unit when the software malicious program detection unit determines that the program integrity file is the malicious program.

12. The program integrity monitoring and contingency management method of claim 11, further comprising comparing the program integrity file based on the exclusion profile to prevent known normal integrity from triggering the generation of the abnormality warning.

13. The program integrity monitoring and contingency management method of claim 11, wherein the file integrity baseline list includes a plurality of hash values and a plurality of corresponding file paths.

14. The program integrity monitoring and contingency management method of claim 11, wherein the exclusion profile includes at least one exclusion rule for excluding a data file.

* * * * *